United States Patent [19]

van der Schoot

[11] 4,242,952

[45] Jan. 6, 1981

[54] PEELING APPARATUS

[75] Inventor: Peter W. C. van der Schoot, Oudekerk, Netherlands

[73] Assignee: Goudsche Machinefabriek B.V., Gouda, Netherlands

[21] Appl. No.: 653,814

[22] Filed: Jan. 30, 1976

[30] Foreign Application Priority Data

Feb. 3, 1975 [NL] Netherlands .................. 7501239

[51] Int. Cl.² .................................... A23N 7/02
[52] U.S. Cl. .................................... 99/625; 15/3.17; 99/626
[58] Field of Search .................. 99/584, 586, 616–618, 99/620, 622–627; 51/76 R; 15/3.16–3.18; 426/483

[56] References Cited

U.S. PATENT DOCUMENTS

| 2,033,912 | 3/1936 | Durand | 15/3.17 |
| 2,178,007 | 10/1939 | Thompson | 99/624 |
| 2,376,587 | 5/1945 | Diller | 15/3.17 |
| 2,394,745 | 2/1946 | Brown | 99/616 |
| 2,448,229 | 8/1948 | McDowell | 99/625 |
| 3,699,881 | 10/1972 | Levin et al. | 100/118 |
| 3,946,658 | 3/1976 | Smith | 99/627 |

FOREIGN PATENT DOCUMENTS 174262 9/1926 Fed. Rep. of Germany ............ 99/625

Primary Examiner—George F. Mautz
Assistant Examiner—Timothy F. Simone
Attorney, Agent, or Firm—Sprung, Felfe, Horn, Lynch & Kramer

[57] ABSTRACT

Apparatus for peeling steam-, lye- or otherwise pretreated tuberous fruits, provided with a plurality of slightly interspaced, parallel, rotation-drivable rollers which are circumferentially provided with peeling elements, such as brushes or embossments, and which are arranged transversely to the main transport direction of the tuberous fruits, said rollers together forming the lower wall of a transport channel disposed at an angle or horizontally.

11 Claims, 5 Drawing Figures

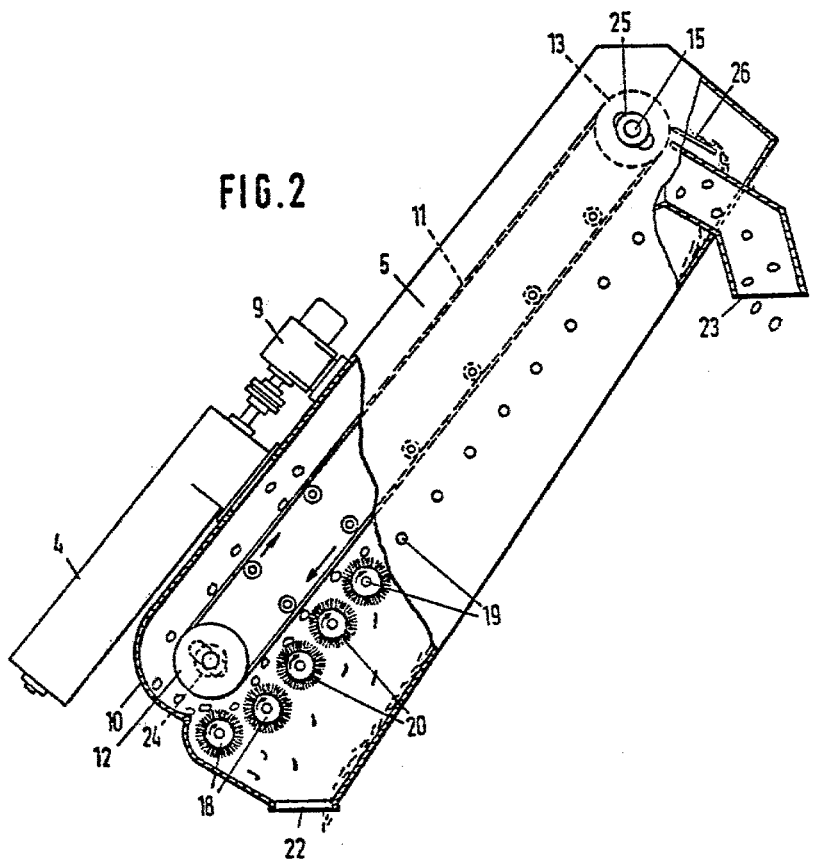

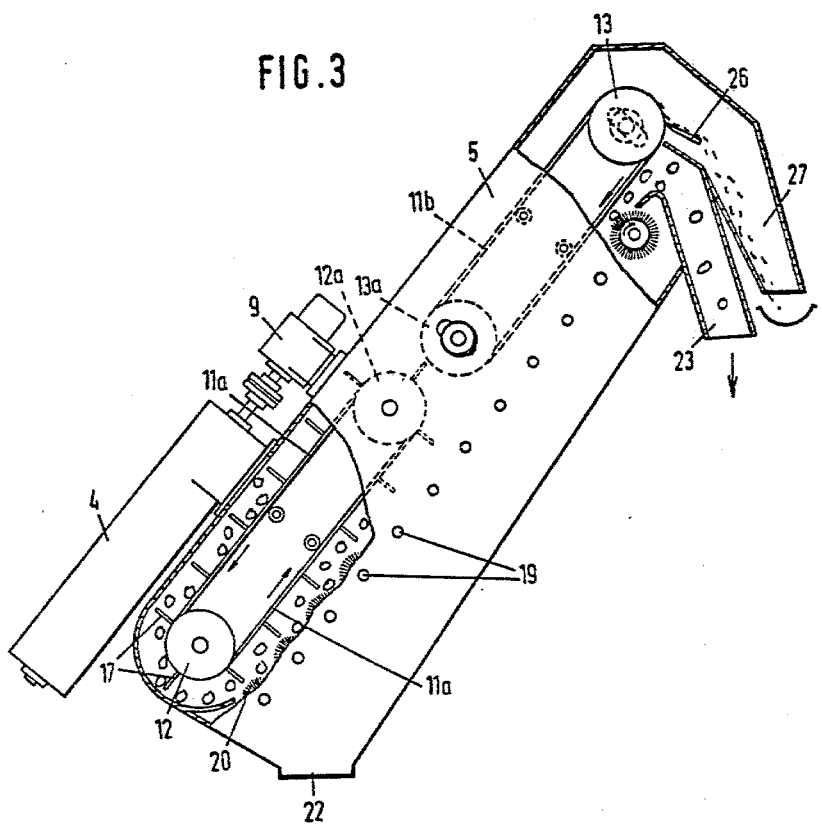

PEELING APPARATUS

The present invention relates to an apparatus for peeling tuberous fruits pretreated with steam or lye or otherwise pretreated, and provided with a plurality of slightly interspaced, parallel, rotation-drivable rollers which are peripherally provided with peeling elements, such as brushes or embossments.

In a known apparatus the pretreated tuberous fruits in particular potatoes, are conducted through a rotating cage formed by rotary brush rollers, the centrelines of said brush rollers being parallel to the main transport direction of the potatoes to be peeled. When applying such cage, preferably a specific, minimal filling degree should be maintained because the potatoes to be peeled would otherwise leave said cage too rapidly and therefore incompletely peeled. The disassembly of such cage for the purpose of maintenance or repair operations is time-consuming and thus disadvantageous from an economical viewpoint, the more so as such a dry peeling apparatus is mostly employed in a chain of processing apparatuses so that a shut-down of the peeling apparatus will put the entire chain out of operation. From the viewpoint of production, different, nominal capacities require different brush roller lengths of different numbers of brushes, necessitating likewise considerable constructive modifications of the entire apparatus.

The object of the invention is to eliminate the above described drawbacks. To this effect according to the invention, in a peeling apparatus of the type mentioned above, the rollers are positioned transversely to the main transport direction of the tuberous fruits, forming together the lower wall of a tubular transport channel.

A thus designed peeling apparatus, from a constructive viewpoint, as a simple structure, is comparatively inexpensive and easily mountable and demountable, while the maintenance is simplified because all bearings and driving mechanisms can be disposed outside the housing of the peeling apparatus. Since the tubular transport channel can likewise be utilized as lifting conveyor, the building length of the peeling apparatus can be reduced relative to that according to known apparatus, which results in reduced investment costs.

The upper wall of the transport channel, in addition to its rebound or hold-down function, also has a rotation-deceleration function. The tuberous fruits as a matter of fact are forced to rotate because of the rotary brushes. Should this rotation speed of the fruits become as large as that of the brushes, the fruits would remain on the brushes in rotating condition and would not be further transported. Because now the upper wall of the transport channel ensures the deceleration of the rotation speed of the fruits, this problem is eliminated.

According to the invention the upper wall of the transport channel may be formed by the lower part of at least one endless conveyor belt.

According to a preferred embodiment of the invention there is employed a smooth conveyor belt of which the lower part runs in a direction opposite to the main transport direction of the tuberous fruits. A major advantage of this arrangement is that the peels adhering to the belt are discharged against the transport direction of the fruits. This smooth belt has another surprising effect, viz. that the fruits supplied through an aperture at the upper side in the peeling apparatus, in particular potatoes, are already substantially peeled by the upwardly moving upper part of the smooth conveyor belt before they come into contact with the brushes.

According to the invention the above-mentioned smooth conveyor belt coacts with a scraping device with the effect that the cleanest part of the lower portion of the conveyor belt is always in contact with the substantially peelel tuberous fruits, so that contamination of the fruits, as a result of peels still adhering to the conveyor belt, is avoided and the potatoes leave the peeling apparatus in clean condition.

Naturally it is also conceivable that the upper wall of the transport channel consists of a stationary, smooth or profiled sheet.

Variations in capacity and brush effect can be simply realized if the internal height of the transport channel is adjustable, which may be done by making adjustable either the conveyor belt or the brush holder or both, or by variation of the belt speed and/or the speed of the brushes.

According to another embodiment of the invention a conveyor belt drivable in the main transport direction may be provided with transverse partitions that subdivide the transport channel in compartments so that a forced displacement of the tuberous fruits through the transport channel, takes place. This implies that the brushing time and the brushing degree can be accurately adjusted by control of the speed of the partitioned belt, since the tuberous fruits press each other down on the brushes or cannon between the brushes and the belt.

According to a further embodiment of the invention the upper wall of the transport channel may on the one hand comprise a first conveyor belt having transverse partitions and which is drivable in the main transport direction, and a second conveyor belt having a smooth surface driven in opposite direction to the main transport direction. By means of the partition belt the brushing time and the brushing degree are accurately adjusted, while the smooth belt ensures that the potatoes are supplied in clean condition.

BRIEF DESCRIPTION OF DRAWINGS

Referring to the accompanying drawings showing some embodiments of the invention;

FIG. 2 is a view similar to FIG. 1 showing another embodiment of the apparatus of the invention; and FIG. 3 is a view similar to FIGS. 1 and 2 showing a further embodiment or variant of the apparatus of the invention;

FIG. 4 shows an embodiment of the invention where the tunnel-like transporting channel is horizontally positioned. FIG. 4 also shows two embodiments. According to the invention, the upper wall defining the transporting channel can be a smooth surface, as represented by reference numeral 40, or can have embossments, as represented by embossments 42, shown in dotted lines. In FIG. 4, the other reference numerals identify the same parts as in FIGS. 1–3.

In FIG. 5, there is shown the embodiment of FIG. 2 except that between two successive rollers there is disposed a rod whose center line runs parallel to that of the rollers.

DESCRIPTION OF SPECIFIC EMBODIMENTS

Figure 1:
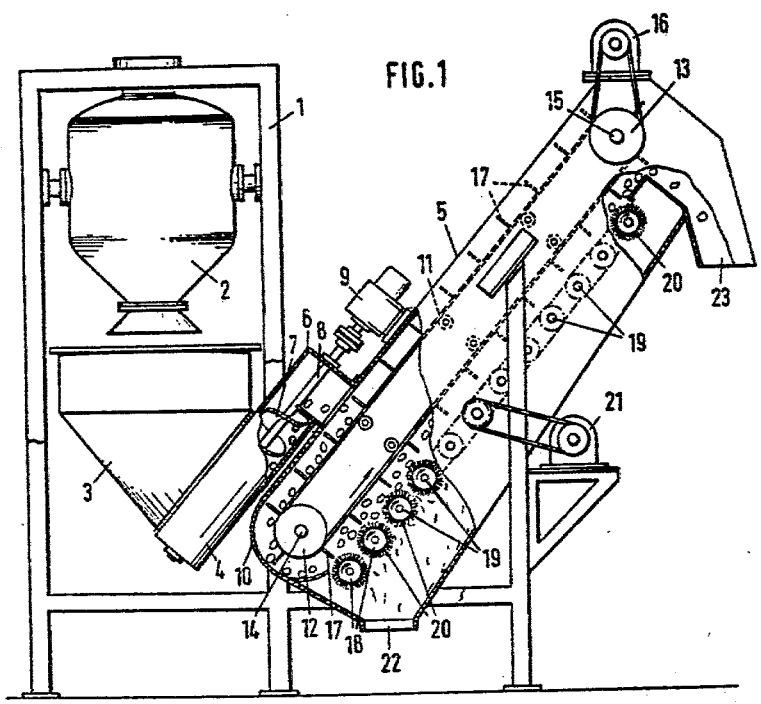
FIG. 1 shows an apparatus according to the invention in side view, some portions of which have been cut away for purposes of clarity.

The peeling apparatus shown in FIG. 1 is provided with a frame 1 comprising a schematically depicted pretreatment device 2 for steam-treating tuberous fruits. Underneath there is disposed a collector hopper 3, the discharge of which communicates with the supply of a dosing conveyor 4, which in its turn is adapted to supply the tuberous fruits, such as potatoes, to be peeled to a dry peeling apparatus 5.

The dosing conveyor 4 comprises a housing 6 wherein is mounted a dosing worm 7 rotatably about a shaft 8, enclosing an angle with the horizontal. The dosing worm 7 is driven by means of a motor 9. The discharge opening of the dosing conveyor 4 is directly contiguous to the supply opening of the dry peeling apparatus 5 disposed in housing 10.

In the housing 10 there is positioned an endless conveyor belt 11 running around two return rollers 12,13 rotatable about horizontal shafts 14, 15, which shafts are perpendicular to the shaft 8 of the dosing worm 7, the plane through both shafts 14, 15 being parallel to the shaft 8. The conveyor belt 11 is driven through roller 13 by a motor 16 and running counterclockwise, seen in FIG. 1.

Transversely to the plane of the conveyor belt 11 there are disposed a plurality of partitions 17. At some distance from the upper face of the conveyor belt 11 and at the side opposite to the dosing conveyor 4 thereof, there are positioned a plurality of identical rollers 18, which are each rotatable about a shaft 19. Each of the rollers 18 is provided circumferentially with a facing, e.g. brushes 20, the distance between the rollers 18 and the conveyor belt 11 being so chosen that the partitions 17 run just free of the brushes 20, while the rollers 18 furthermore are so relatively positioned that between two adjacent brushes 20, there remains a slight free interspace.

The rollers 18 are jointly driven by a motor 21 in clockwise direction in FIG. 1, so running in the direction of the lower part of the conveyor belt 11. The bearings and driving gear of both the conveyor belt 11 and the rollers 18 are all present outside the housing 10 of the dry peeling apparatus 5. Said housing 10 is furthermore provided with a discharge opening 23 for the peeled potatoes and with a peel discharge opening 22 at the lower end of a bottom plate which forms part of the housing 10 and positioned at a specific angle, which bottom plate serves for receiving and conducting the peel rests towards the peel discharge opening.

The operation of the peeling apparatus is the following: In the pretreatment device 2 the peels of the potatoes are loosened with steam or lye and thereafter deposited batch-wise in the receiving hopper 3, from which pretreated potatoes arrive in the dosing conveyor 4 where the worm 7 ensures that the potatoes are uniformly distributed on the conveyor belt 11 of the dry peeling apparatus 5. This means that in each compartment formed by partitions 17 there arrives a substantially equal quantity of potatoes. The potatoes are entrained by the belt 11 with partitions 17 in the direction of the rotating brushes 20. By increasing the circumferential speed of the brushes above the speed of the conveyor belt, a potato, as soon as it comes into contact with the first brush, will bounce and bound between brushes and belt so that the potato is deprived from its loosened peel through the brushing effect. The loosened peels are discharged through the slight interspaces between the brushes and removed via the peel discharge opening 22 from the housing 10 of the dry peeling apparatus 5. The peeled and cleaned potatoes, propelled by the partitions 17 and brushes 20, are discharged via the opening 23 towards a processing or storage device.

Because practically all potatoes brought into a compartment are forced to remain therein, the brushing time can be accurately and optimally adjusted.

FIG. 2 shows a modified embodiment of the invention. The difference between the two embodiments mainly resides in the design of the conveyor belt. FIG. 2 depicts the parts identical to those of FIG. 1 having the same reference numerals.

The conveyor belt 11 in the apparatus shown in FIG. 2 is designed as smooth belt with partitions or other projections. The rollers 12 and 13 are adjustable by means of a diagrammatically shown adjusting device 24, 25 relative to the rollers 18 with brushes 20. Furthermore there is disposed yet a diagrammatically shown scraper device 26 adjacent roller 13.

The conveyor belt 11 in FIG. 2 is driven relative to that shown in FIG. 1 in opposite direction and therefore runs in a direction opposite to the main transport direction of the potatoes to be peeled. The speed of the belt 11 is such that the potatoes can roll downwardly by gravity along the oppositely running conveyor belt 11 from the feed opening in, the housing 10 of the dry peeling apparatus 5. Thus a major portion of the peels is already removed by the sweeping effect caused by the conveyor belt 11, which peels are directly discharged upwardly by the belt 11 and therefore do not come into contact with the bushes 20. Once within the reach of said brushes, the potatoes are further cleaned and transported. Through the opposite course of the conveyor belt, the contact time between potato and brush is extended, while the brushing degree, the brushing time and the quality of potatoes to be processed can be controlled on the one hand by adjusting the distance between the conveyor belt 11 and the brushes 20 by means of the adjusting device 24, and on the other hand by modification of the speed of the belt 11 and the number of revolutions of rollers 18.

The smooth conveyor belt 11 furthermore can be simply deprived of peels adhering thereto by means of the scraper device 26, which peels are conducted towards the peel discharge opening 22, which can be simply effected by installing the scraper device 26 adjacent the roller 13. The opposite course of the conveyor belt 11 results in that all peels adhering thereto are entrained downwardly and the cleanest portion of the conveyor belt 11 always coacts with the already cleaned potatoes so that fouling of the cleaned potatoes is minimized as a result of a contaminated conveyor belt.

FIG. 3 shows a third embodiment of the invention wherein the conveyor belts shown in FIGS. 1 and 2 are combined. Also in FIG. 3 identical parts are again indicated by identical reference numerals. For the first portion of the transport of the potatoes to be peeled from the dosing conveyor 4 towards the discharge opening 23, there is employed an endless conveyor belt 11a having partitions 17, which runs about a pair of rollers 12, 12a, so that substantially all potatoes are forced to advance during the first part of the transport path. The conveyor belt 11a runs in the same direction as the main transport direction of the potatoes to be peeled. The second part of the transport channel is confined at the upper side by an endless, smooth conveyor belt 11b, which runs around a set of adjustable return rollers 13, 13a oppositely to the main transport direction. Adjacent the roller 13 there is again disposed a scraper device 26. The scraped peels are conducted via a second peel discharge opening 27 outside the housing 10.

The above described embodiments shown in the drawing exclusively serve for elucidating the peeling apparatus according to the invention. It stands to reason that many variants and modifications are possible within the scope of the invention. For instance it will be possible to replace the conveyor belts by a stationary, smooth or profiled sheet in combination with moving or non-moving scrapers or blowers, or the installation of the brush rollers adjustably relative to the conveyor belt. Also the dry peeling apparatus may be disposed substantially horizontally to serve in said position as prewashing device. Finally, it is also possible to eliminate the above described drawback of the hampered transport of the tuberous fruits because the same rotation speed is imparted thereto as the rotating brushes by the installation of a rod between two brushes, the centreline of the rod being parallel to the centreline of the brushes.

I claim:

1. Apparatus for peeling tuberous fruits comprising an elongated tunnel-like transporting channel defined by fruit contacting upper and bottom walls between which said fruits are to be conveyed, the distance between said upper and bottom walls being such that fruit being passed therethrough can move freely across said channel to cannon between said upper wall and said bottom wall, said bottom wall being formed by the upper surface of a plurality of slightly interspaced parallel rollers positioned tranversely to the main transport direction of the tuberous fruits, said rollers provided circumferentially with peel removing elements, said upper wall of the transporting channel comprising the lower part of at least one endless conveyor belt which is smooth on the side facing said rollers, said rollers connected to means for rotating the same at a circumferential speed greater than the speed of said endless conveyor belt and at sufficient speed to impart rotation to fruit in contact therewith while removing peel from said fruit and discharging said peel away from said channel and the transporting direction of the fruit and through interspaces between rollers by centrifugal speed of rotation of said rollers, the circumferential speed of said rollers being sufficient to cause said fruit to bounce and bound away from said rollers while rotating and against said endless conveyor belt whereby the fruit's speed of rotation is altered upon striking said endless conveyor belt.

2. Apparatus according to claim 1, characterized in that the tunnel-like transporting channel is horizontally positioned.

3. Apparatus according to claim 1, characterized in that the conveyor belt is provided with a plurality of transverse partitions and is drivable in the main transport direction.

4. Apparatus according to claim 1 characterized in that the upper wall of the transporting channel comprises the lower part of a first conveyor belt having transverse partitions, driven in the main transport direction and the lower part of a second conveyor belt having a smooth surface which is driven oppositely to the main transport direction.

5. Apparatus according to claim 1 characterized in that the smooth conveyor belt coacts with a scraper device.

6. Apparatus according to claim 1, characterized in that the internal height of the transporting channel is adjustable.

7. Apparatus according to claim 1, characterized in that between two successive rollers there is disposed a rod whose centreline runs parallel to that of the rollers.

8. An apparatus according to claim 1 wherein the peel removing elements are brushes.

9. An apparatus according to claim 1 wherein the peel removing elements are embossments.

10. An apparatus according to claim 1 wherein said conveyor belt is drivable opposite to the main transport direction of the tuberous fruit.

11. Apparatus according to claim 1 wherein said upper wall is a conveyor belt and said apparatus comprises means for rotating said conveyor belt in a direction opposite to that of said rollers.

* * * * *